United States Patent

Daudi

[11] Patent Number: 6,032,769
[45] Date of Patent: Mar. 7, 2000

[54] MODULAR ROTOR

[75] Inventor: Anwar R. Daudi, Ann Arbor, Mich.

[73] Assignee: Hayes Lemmerz International, Inc., Northville, Mich.

[21] Appl. No.: 09/151,488

[22] Filed: Sep. 11, 1998

[51] Int. Cl.[7] ................................. F16D 65/00
[52] U.S. Cl. ................... 188/218 X; 29/527.6; 188/264 AA
[58] Field of Search .................... 188/218, 73.2, 188/71.6, 264 A, 264 AA, 218 R, 250 B, 250 G, 264 G, 73.1, 18 A, 73.37, 250 E, 70 R, 58, 59; 192/113.2, 113.21, 113.23; 301/6.1, 6.3, 6.8; 29/527.6, 527.5; 164/98, 95

[56] References Cited

U.S. PATENT DOCUMENTS

| | | | |
|---|---|---|---|
| 2,197,232 | 4/1940 | Wood . | |
| 3,486,218 | 12/1969 | Buyze . | |
| 4,177,883 | 12/1979 | Margetts | 188/218 X |
| 5,107,966 | 4/1992 | Metzler et al. . | |
| 5,161,652 | 11/1992 | Suzuki . | |
| 5,460,249 | 10/1995 | Aoki | 188/264 A |
| 5,544,726 | 8/1996 | Topouzian et al. . | |

*Primary Examiner*—Douglas C. Butler
*Attorney, Agent, or Firm*—Marshall & Melhorn

[57] ABSTRACT

The present invention relates to a modular brake rotor having friction rings secured to a core. The core includes a hat section having a hat wall, and a plurality of circumferentially spaced apart support ribs. A pair of friction rings having inner surfaces are secured to the support rib inboard and outboard mounting surfaces. The support ribs extend into recesses formed in the inner surfaces of the friction rings to secure the friction rings to the support ribs. The ribs may include protrusions formed using dowels which extend through the support ribs and project out of the inboard and outboard mounting surfaces and into the recesses. Alternatively, the protrusions may be formed integrally with the support ribs.

20 Claims, 4 Drawing Sheets

MODULAR ROTOR

BACKGROUND OF INVENTION

The present invention relates to an vehicle brake rotor and more specifically to a modular brake rotor having friction rings secured to the ribs of a core.

Wheeled vehicles are typically slowed and stopped with a braking system that generates frictional forces. One known braking system is the disc braking system which includes a rotor attached to one or more of the vehicle wheels for rotation therewith. The rotor has an annular peripheral section comprised of a pair of annular friction rings joined together by spacers or ribs in a mutually parallel, spaced apart relationship to form spaces or vents therebetween. Friction surfaces are disposed on the opposite, outwardly facing annular surfaces of the friction rings.

The disc brake system also includes a caliper assembly secured to a non-rotating component of the vehicle, such as the vehicle frame. The caliper assembly includes a pair of brake pads, each having a backing plate and brake lining material attached thereto. A pad is disposed adjacent each friction ring such that the brake lining material is adjacent the friction surface. The caliper assembly includes at least one moveable piston operatively connected to the backing plate of at least one of the brake pads. When the driver brakes the vehicle, hydraulic or pneumatic forces move the piston which clamps the brake lining material of the pads against the friction surfaces of the rotating rotor. As the pads press against the moving rotor friction surfaces, frictional forces are created which oppose the rotation of the wheels and slow the vehicle.

It is known to assemble rotors from separate components to form a modular rotor. Buyze (U.S. Pat. No. 3,486,218) discloses a ventilated modular rotor having a core including a mounting flange and a corrugated spacer stamped from a single piece of sheet or coil steel stock. Annular friction rings, formed from sheet or coil steel stock, are secured to the corrugated spacer by welding, brazing or adhesives. However, the corrugated ribs have only a small amount of surface area in contact with the friction rings which reduces options available for securing the friction rings to the ribs. It is desirable to produce a modular rotor having a core with ribs that have mounting surfaces of sufficient surface area for securing friction rings thereto in a variety of manners.

It is also desirable to produce a modular rotor with a cast core having ribs secured to the friction rings for providing a strong, durable rotor that is cost efficient to produce. Metzler, et al (U.S. Pat. No. 5,107,966) teaches joining a cast hub to a cast friction portion using compound casting. A hub portion including a plurality of radially extending projections is cast from a material having a high tensile strength. A friction portion including spaced apart friction rings joined together by a plurality of webs running in the axial direction is then cast around the hub portion. The friction rings clasp the radially extending projections to secure the friction rings to the hub portion. However, compound casting will not enable adhesives to be disposed between the friction portion and the hub portion since the casting of the friction rings will incinerate the adhesive. It is desirable to reduce the transmission of vibrations between the friction rings and the hub portion by using a construction technique which would allow the use of adhesives therebetween.

SUMMARY OF INVENTION

The present invention relates to a modular brake rotor having friction rings secured to a core. The core includes a hat section having a hat wall, and a plurality of circumferentially spaced apart support ribs. The core is preferably formed of cast metal, such as cast grey iron or aluminum MMC. A pair of friction rings having inner surfaces are secured to the support rib inboard and outboard mounting surfaces. The support ribs extend into recesses formed in the inner surfaces of the friction rings to secure the friction rings to the support ribs. An adhesive is disposed between the support ribs and the friction rings to further secure the friction rings to the support ribs and reduce the transmission of vibrations therebetween.

The support ribs may alternatively include protrusions extending from the inboard and outboard mounting surfaces which extend into the recesses. The protrusions may be formed using dowels which extend through the support ribs and project out of the inboard and outboard mounting surfaces. Alternatively, the protrusions may be formed integrally with the support ribs.

The invention also relates to a method of manufacturing a brake rotor including the steps of forming a rotor core including a hat section and support ribs extending radially outwards from the hat section. Each of the support ribs include flat oppositely directed inboard and outboard mounting surfaces. A pair of friction rings are formed, each having an outer surface and an inner surface with recesses formed in the inner surface. The friction rings are pressed against the support ribs so that the ribs are received in the recesses to secure the friction rings to the support ribs.

Other advantages of this invention will become apparent to those skilled in the art from the following detailed description of the preferred embodiment, when read in light of the accompanying drawings.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENT

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein should not to be considered as limiting, unless the claims expressly state otherwise.

Figure 1:
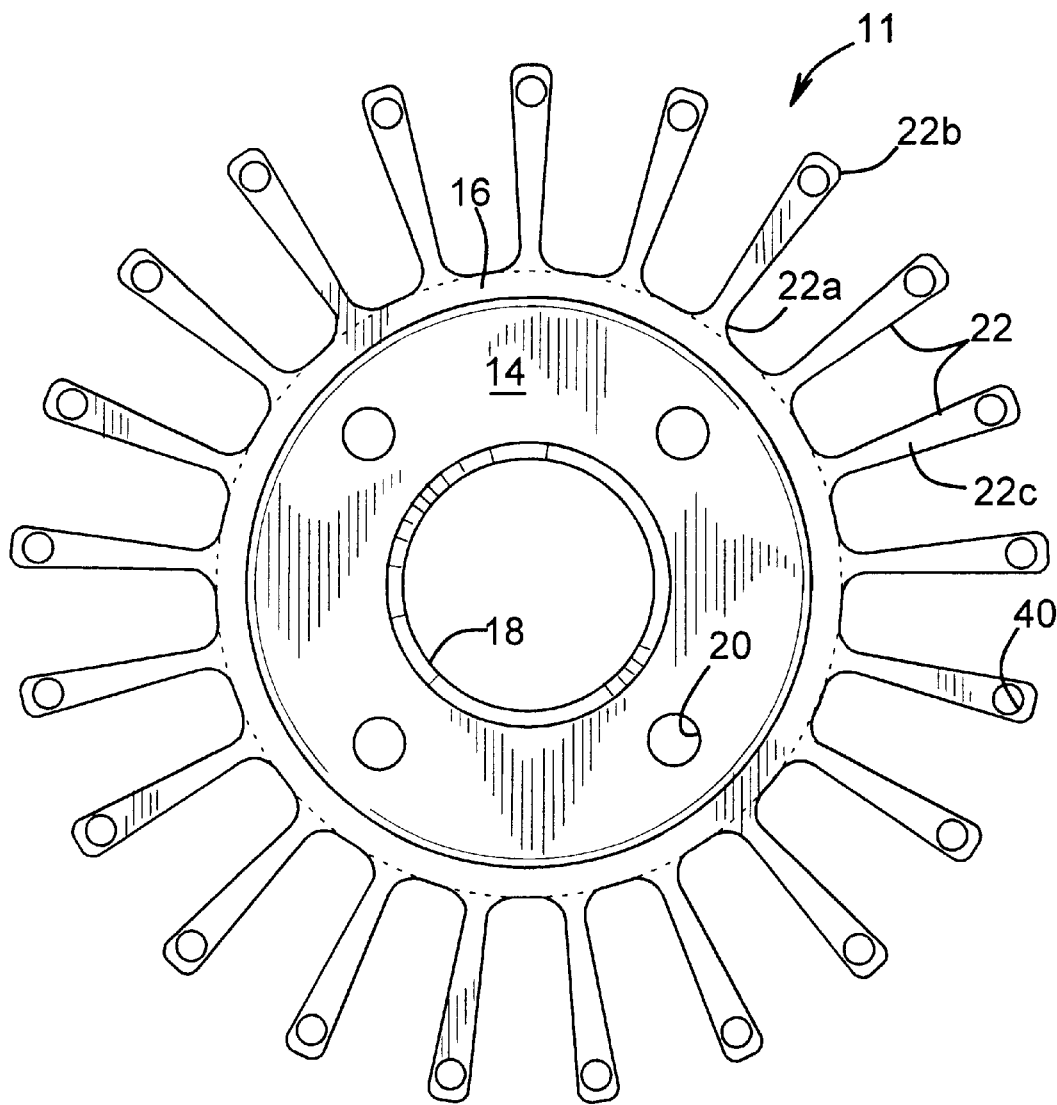
FIG. 1 is a plan view of a rotor core in accordance with the invention.
Figure 2:
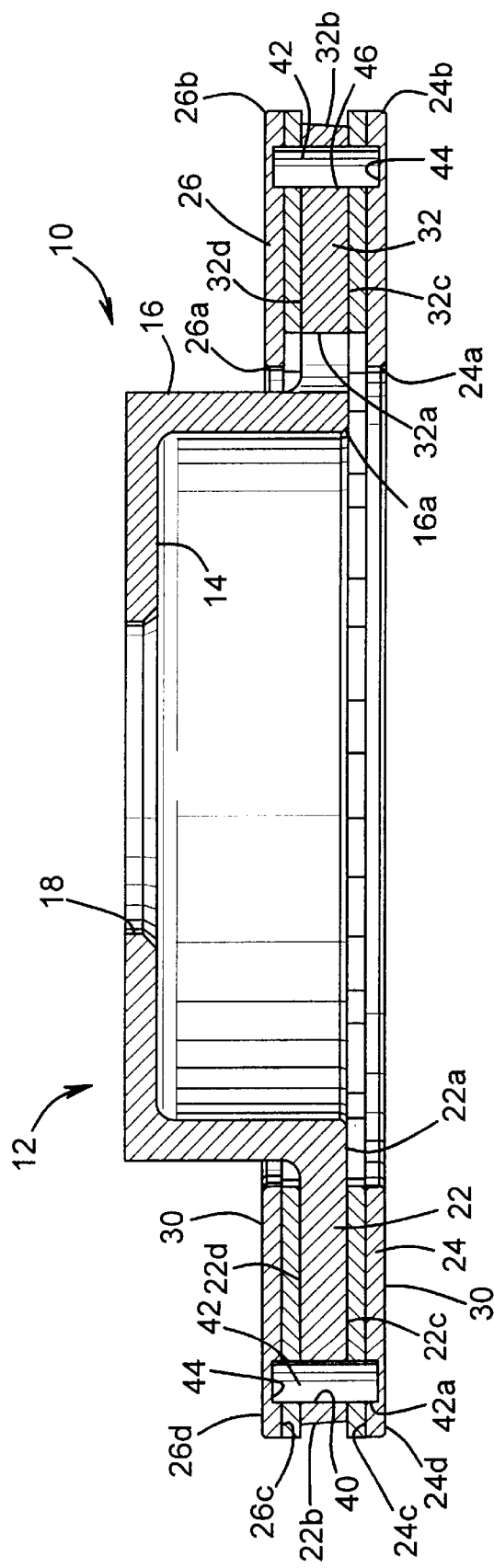
FIG. 2 is a sectional view of the rotor in accordance with the invention with the thickness of the adhesive exaggerated for clarity.

Referring now to the drawings, there is illustrated in FIGS. 1 and 2 a rotor embodying the present invention and designated generally with the reference numeral 10. The rotor 10 is of the type adapted for use in conjunction with a variety of mechanical devices, especially disc brake braking systems and the like.

The rotor 10 has a core 11 consisting of a hat section 12 having a central mounting face 14 for mounting the rotor 10 on an associated drive member (not shown), such as a spindle or vehicle axle. The hat section 12 also includes a generally cylindrical shoulder or hat wall 16 extending from the periphery of the mounting face 14 and terminating at an inboard edge 16a. Alternatively, the hat wall 16 may be inclined relative to the mounting face, forming a portion of a cone.

The central mounting face 14 of the hat section 12 of rotor 10 is provided with a central pilot aperture 18 in which a spindle hub or the like (not shown) may be closely received, and a plurality of circumferentially spaced apart fastener apertures 20 in which fasteners (also not shown) may be received to mount the rotor 10 on an associated drive mechanism in the conventional manner.

The core 11 also includes a plurality of individual, circumferentially spaced apart support ribs 22 interconnected at their radially inner ends 22a with the radially outer surface of the hat wall 16 proximate the inboard edge 16a thereof. The support ribs 22 preferably extend straight, radially outwards from the hat wall 16, terminating in radially outer ends 22b. Alternatively, the ribs 22 may be curved, extending away from the hat wall 16 at angles with respect to radius of the hat section 12. The support ribs 22 preferably are all similarly shaped, each having a flat inboard mounting surface 22c and a flat outboard mounting surface 22d. The inboard and outboard mounting surfaces 22c and 22d are preferably mutually parallel and together define a support rib thickness which is preferably constant from the radially inner ends 22a to the radially outer ends 22b. The flat inboard mounting surfaces 22c of all of the support ribs are coplanar, as is the flat outboard mounting surfaces 22d. Alternatively, the support ribs 22 may have different shapes, or may not have a constant thickness.

The core 11 is preferably an integral or one-piece unit, with the support ribs 22 formed integrally with the hat section. The core is formed of any suitable material such as, for example, cast grey iron, aluminum, or alloys or composites of either including aluminum MMC and the like.

Figure 3:
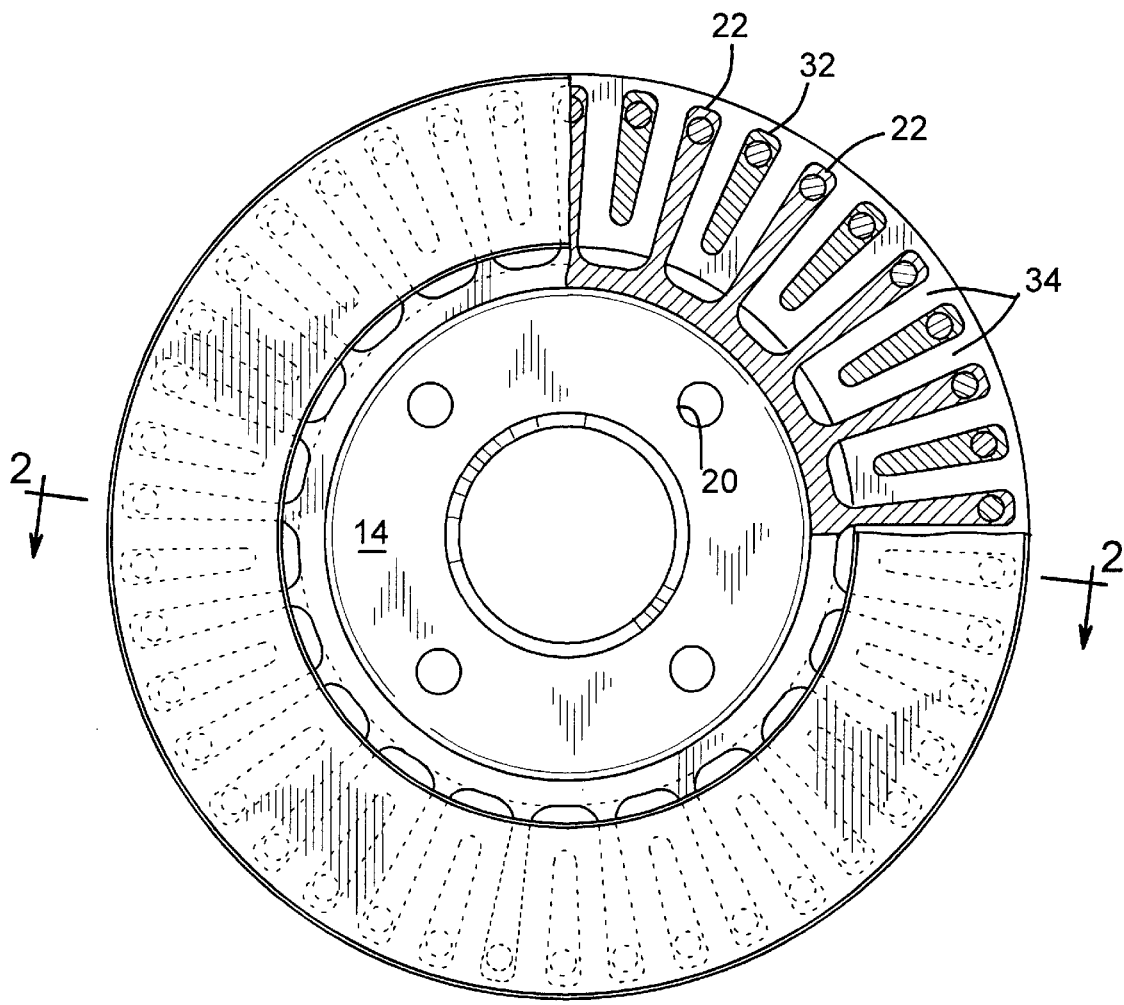
FIG. 3 is a partial sectional view of the in accordance with the invention.

Referring now to FIGS. 2 and 3, a pair of annular friction rings, including an inboard friction ring 24 and outboard friction ring 26, are secured to the core 11 by attachment to the support ribs 22 as described in detail below. The friction rings 24, 26 are secured to the support rib inboard and outboard mounting surfaces, 22c and 22d respectively, in a mutually parallel, spaced apart relationship. The annular friction rings 24, 26 have radially inner edges 24a and 26a which define the inner diameters of the friction rings, and radially outer edges 24b and 26b which define the outer diameters of the friction rings. The support ribs 22 fixedly interconnect the friction rings 24 and 26 with the hat section 12 of the rotor 10, in a manner such that the entire inner edges 24a, 26a of both of the friction rings 24 and 26 are spaced apart, radially outwards from the outer diameter of the hat wall 16.

The friction rings 24, 26 also have generally flat, inwardly facing sides 24c and 26c which face each other, and generally flat outwardly facing sides 24d, 26d. Flat annular friction surfaces 30 are located on the outwardly facing sides 24d, 26d of the friction rings 24 and 26. The friction surfaces 30 are adapted to interface with associated friction members (not shown), such as brake pads or the like.

A plurality of circumferentially spaced apart secondary ribs 32 are provided to also fixedly interconnect the inboard friction ring 24 with the outboard friction ring 26. The secondary ribs 32, however, are spaced apart in the radial direction from the outer diameter of the hat wall 16. The radially inner ends 32a of the secondary ribs 32 preferably do not extend radially inward beyond the inner edges 24a, 26a of the friction rings 24 and 26. The radially outer ends 32b of the secondary ribs preferably do not extend beyond the outer edges 24b, 26b of the friction rings 24, 26.

The secondary ribs 32 preferably are all similarly shaped, each having a flat inboard mounting surface 32c and a flat outboard mounting surface 32d. The inboard and outboard mounting surfaces 32c and 32d are preferably mutually parallel and together define a secondary rib thickness which is preferably constant from the radially inner ends 32a to the radially outer ends 32b, although alternatively this thickness may vary. The secondary ribs 32 have the same thickness as the support ribs 22.

The support ribs 22 and the secondary ribs 32 are arranged between the friction rings 24 and 26 with the secondary ribs 22 interspersed between the support ribs 32. In the illustrated embodiment, which is preferred, the support ribs 22 and secondary ribs 32 are arranged in an alternating fashion.

Radially extending spaces or radial vents 34 are defined between the inwardly facing sides 24c and 26c of the friction rings 24, 26 and the support and secondary ribs 22, 32. The radial vents 34 are open at the inner edges 24a, 26a and the outer edges 24b, 26b of the friction rings 24, 26 to form air passages therebetween. As the rotor turns, air typically flows radially outwardly through the vents. Each vent 34 can receive air flowing from the inboard side of the rotor 10 between the hat wall 16 and the inner edge 24a of the inboard friction ring 24, as well as air flowing from the outboard side of the rotor 10 between the hat wall 16 and the inner edge 26a of the outboard friction ring 26. The inboard and outboard flow path enables a large quantity of air to flow through the vents 34 providing maximum cooling effectiveness.

The support ribs 22 and the secondary ribs 32 are both preferably tapered to enhance the air flow through the vents 34. The tapered ribs 22, 32 have wider radially outer ends 22b, 32b and narrower radially inner ends 22a, 32a when viewed from the inboard or outboard mounting surfaces (as seen in FIG. 3). The ribs 22, 32 are tapered so that the cross sectional area of the radial vents 34, defined between the ribs 22, 32 and the friction ring inner surfaces 24c, 26c, remains approximately constant from the inner ends to the outer ends of the secondary ribs 32. The constant cross sectional area of the vents 34 reduces pressure differentials between the radially inner and radially outer ends of the vents which may impede the flow of air through the vents. However, the shape, size and location of the ribs 22 and 32 can be varied to achieve the desired air flow characteristics.

The friction rings 24 and 26 are secured to the support ribs 22 using a mechanical connection, preferably including a combination of dowels and adhesives. The support ribs 22 include a hole 40 extending from the inboard mounting surfaces 22c to the outboard mounting surfaces 22d. The hole 40 is preferably located near the radially outer end 22b of the support ribs 22, although it may be located in any suitable location.

Dowels 42 are disposed in each of the holes 40 and extending through the support ribs 22. The dowels 42 form protrusions 42a which extend out of the inboard and outboard mounting surfaces 22c and 22d and into recesses 44 formed in the friction ring inner surfaces 24c and 26c. The recesses 44 do not extend completely through the friction rings to the outer surfaces 24d and 26d thereof. The dowels 42 are preferably cylindrical having a radius equal to the radius of the holes 40 and recesses 44 to provide a press fit or friction fit therebetween which securely retains them within the ribs 22. The friction fit between the dowels 42 and the recesses 44 securely retains the friction rings 24, 26 to the support ribs 22 and thus to the hat section 12. Alternatively, the holes 40, the recesses 44 and the dowels 42 may have any suitable shape necessary to provide a friction fit therebetween capable of securing the friction rings 24, 26 to the support ribs 22. Additionally, optional fasteners such as set screws (not shown) may be used to secure the dowels 42 to the ribs 22.

The friction rings 24 and 26 are secured to the secondary ribs 32 in a similar manner as the support ribs 22. The secondary ribs 32 include a hole 46 extending therethrough similar to the support rib holes 40. Dowels 42 are disposed in each of the holes 46 and extend into recesses 44 formed in the friction rings as described above.

An adhesive 50 is disposed between ribs 22, 32 and the friction rings 24, 26 to further secure the friction rings to the ribs. The adhesive is preferably a viscoelastic adhesive such as silicone or enamel, although any suitable viscoelastic adhesive may be used. In addition to providing a bond between the friction rings 24, 26 and the ribs 22, 32, the adhesive functions as a noise reducing element, dampening vibrations by converting vibrational energy into heat. This conversion occurs either by the mechanical extension and contraction of the material, or by shear within the material. The viscoelastic adhesive dampens the vibrations which tend to cause the entire rotor to resonate thus reducing undesirable noise. Alternatively, any suitable non-viscoelastic adhesive may be used.

The method of producing the rotor disclosed above shall now be discussed. The core 11 is cast using any suitable known method, to includes a flat annular disc (not shown) extending radially from the hat wall 16 proximate the inboard edge 16a. The disk preferably has flat inboard and outboard surfaces. The disk is then machined to form the individual support ribs 22 using shearing, wire EDM, or any other suitable machining or milling operation.

Alternatively, the core 11 is cast with the individual support ribs 22 extending from the hat wall 16 of the hat section 12. The individual support ribs 22 preferably are cast with flat inboard and outboard mounting surfaces, although the ribs may be machined to the desired dimensions after casting.

The friction rings 24 and 26 are preferably cast using any suitable known casting method. The friction rings may be machined after casting to achieve the desired dimensions. Alternatively, the friction rings 24, 26 may be formed of steel using any suitable method such as stamping. The friction rings 24 and 26 are then secured to the support ribs 24 of the core 11 using a mechanical connection preferably including a combination of dowels and adhesives. Alternatively, the mechanical connection may include mechanical fasteners such as rivets, or other known mechanical fasteners.

The dowel holes 40 are machined in the support ribs 22 by any suitable known machining operation. The holes may alternatively, be cast into the support ribs 22 and then finish machined by any known manner. The finished holes 40 have a predetermined diameter. Dowels 42 having a diameter equal to or slightly larger than the diameters of the holes 40 are press fit into each of the holes 40 such that the ends of the dowels extend a predetermined distance out of the inboard and outboard mounting surfaces 22c and 22d. The press fit securely retains the dowels 42 within the support ribs 22.

The secondary ribs 32 are formed by any known manner such as casting or machining. A hole 40 is formed through each secondary rib 32 in a similar manner as the support ribs 22. The dowels 42 are also press fit into each of the secondary rib holes 40 in a similar manner as the support ribs 22. The dowels 42 are preferably cylindrical having a radius equal to or slightly larger than the holes 40 to provide a friction fit which securely retains them within the ribs 22 and 36. Additional, optional fasteners such as set screws (not shown) may be used to secure the dowels 42 to the ribs 22, 32.

Recesses 44 are formed in the friction ring inner surfaces 24c and 26c so as to align with the dowels 42. The recesses 44 are positioned to correspond with the location of the holes 40 in the ribs 22 and 36.

An adhesive is placed between the friction ring inner surfaces 24c, 26c and the mounting surfaces of the ribs 22, 32 as described above. The friction rings 24, 26 are then pressed against the inboard and outboard mounting surfaces of the ribs in a manner which causes the dowels 42 to be pressed into the recesses thereby securing the friction rings to the support ribs. The friction rings 24, 26 are further pressed until the adhesive is pressed between the friction rings 24, 26 and the ribs 22, 32. The adhesive is allowed to dry or cure until the friction rings 24, 26 are securely bonded to the ribs 22, 32. The friction rings 24, 26 of the rotor 10 may then be finish machined to produce flat friction surfaces 30 thereon.

Figure 4:
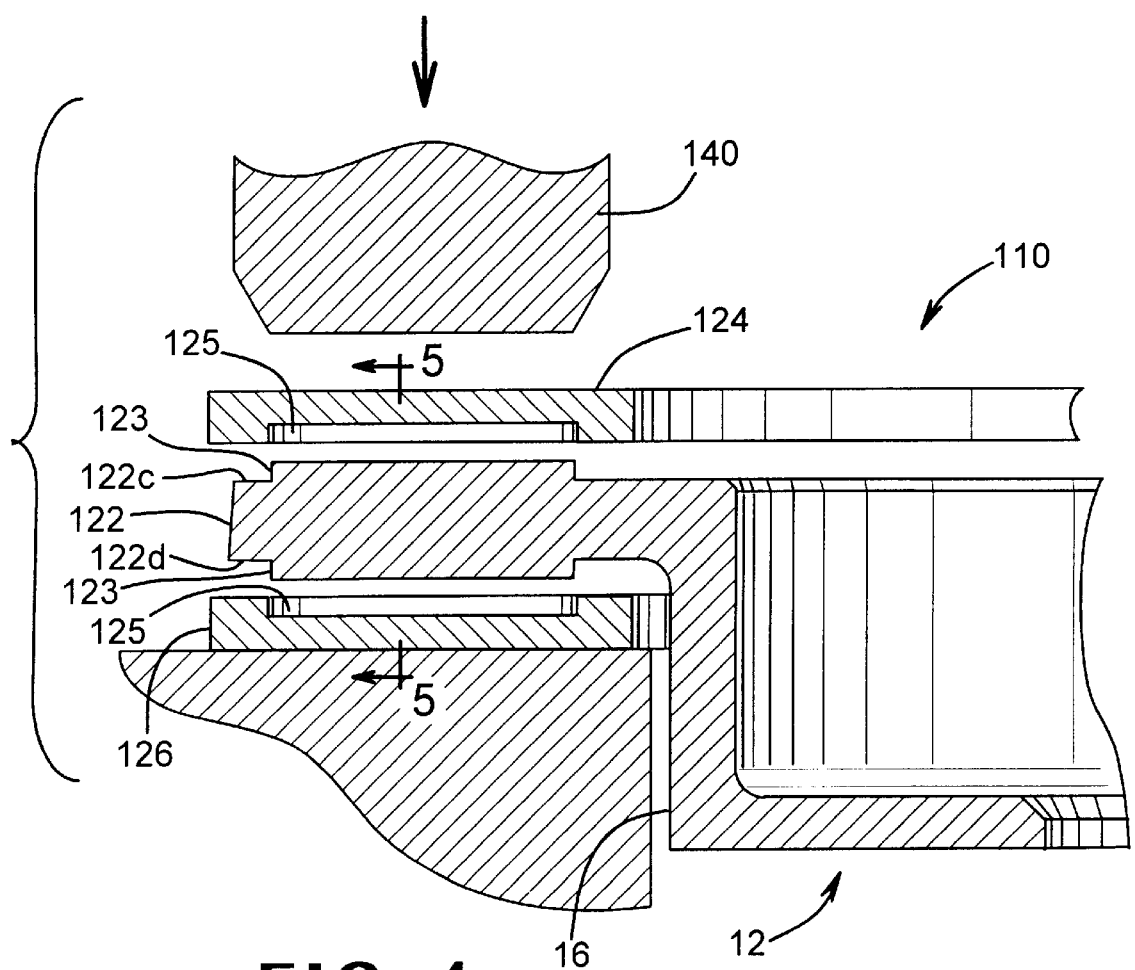
FIG. 4 is sectional elevational view of an alternate embodiment of the rotor.
Figure 5:
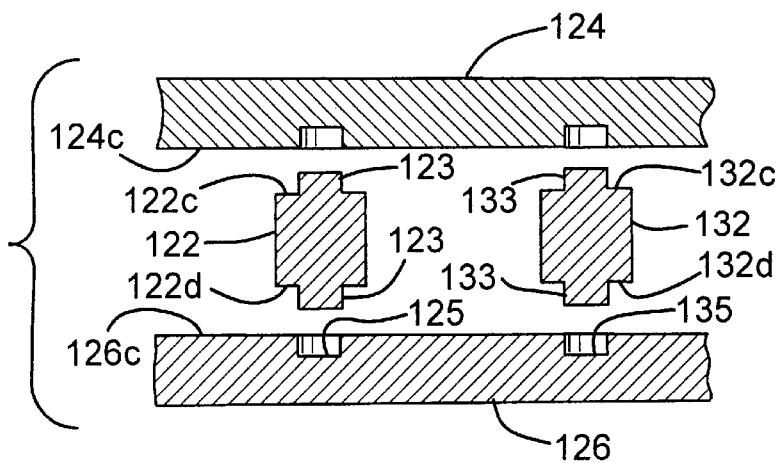
FIG. 5 is a sectional elevational view taken along line 4—4 of the alternate embodiment of FIG. 4.

Referring now to FIGS. 4 and 5, an alternate embodiment of a modular rotor shown generally at 110 is illustrated. The modular rotor 110 is similar to the rotor 10 described. The modular rotor 110 includes a core 11 having a hat section 12 and integral support ribs 122 extending from the hat wall 16 as described above. The support ribs 122 are similar to the support ribs 22 described above and include a flat inboard mounting surface 122c and a flat outboard mounting surface 122d. The support ribs 122 further include protrusions 123 extending outwardly from the mounting surfaces 122c and 122d. The protrusions 123 are preferably formed integrally with the support ribs 122, though alternatively, separate protrusions may be secured to the support ribs 122 in a known manner.

The rotor 110 further includes a pair of annular friction rings, including an inboard friction ring 124 and outboard friction ring 126. The friction rings 124, 126 are secured to the support rib inboard and outboard mounting surfaces, 122c and 122d respectively in a manner describe below. The friction rings 124, 126 are spaced radially outwards from the hat section and disposed in a mutually parallel, spaced apart relationship similar to the friction rings 24, 26 described above.

The annular friction rings 124, 126 further include support rib recesses 125 formed on the flat inwardly facing sides 124c and 126c. The shape and position of the support rib recesses 125 correspond to the shape and position of the support rib protrusions 123, so that the protrusions are received in the recesses when the rotor 110 is assembled as described below. The recesses may be formed in only one of the inwardly facing sides. Alternatively, the support ribs may or may not include protrusions, the recesses 125 are shaped to correspond to the shape of the support ribs, and the support ribs extend into the recesses 125 when the rotor 110 is assembled.

A plurality of circumferentially spaced apart secondary ribs 132 are provided to also fixedly interconnect the inboard friction ring 124 with the outboard friction ring 126. The secondary ribs 132 are disposed between the support ribs 122 and spaced apart from the hat section in a similar manner as the support ribs 32 described above.

The secondary ribs 132 include protrusions 133 extending outwardly from the mounting surfaces 132c and 132d, similar to the support rib protrusions 123. The protrusions 133 are preferably formed integrally with the secondary ribs 132, though alternatively, separate protrusions may be secured to the secondary ribs 132 in a known manner. The protrusions 133 are received into secondary rib recesses 135 formed on the flat inwardly facing sides 124c and 126c of the friction rings 124 and 126 respectively. The shape and position of the secondary rib recesses 135 correspond to the shape and position of the secondary rib protrusions 133, so that the protrusions are received in the recesses when the rotor 110 is assembled. Alternatively, the secondary ribs 135 may or may not include protrusions, the secondary rib recesses 135 are shaped to correspond to the shape of the secondary ribs, and the secondary ribs extend into the recesses 135 when the rotor 110 is assembled.

The method of producing the rotor 110 shall now be discussed. The core 11 is cast using any suitable known method with the individual support ribs 122 formed during the casting and extending from the hat wall 16 of the hat section 12. The individual support ribs 122 are preferably cast with the protrusions 123 extending from flat inboard and outboard mounting surfaces 122d and 122d. Alternatively the ribs 122 may be machined to the desired dimensions after casting to form the protrusions 123.

Alternatively, the core 11 is cast to include a flat annular disc (not shown) extending radially from the hat wall 16 proximate the inboard edge 16a. The disk preferably has flat inboard and outboard surfaces. The disk is then machined to form the individual support ribs 122 having the protrusions 123, using shearing, wire EDM, or any other suitable machining or milling operation. The secondary ribs 132 are formed by any know manner such as casting or machining to include the protrusions 133 extending from the mounting surfaces 132c and 132d mentioned above.

The friction rings 124 and 126 are preferably cast using any suitable known casting method. The friction rings 124 and 126 are preferably cast having the support rib recesses 125 and secondary rib recesses 135 formed in the inwardly facing sides 124c and 126c. The recesses 125, 135 may be machined after casting to achieve the desired dimensions. Alternatively, the friction rings 124, 126 may be formed of steel using any suitable method such as stamping and the recesses formed using known machining methods.

The friction rings 124 and 126 are then secured to the support ribs 122 of the core 11 preferably using staking. The friction rings 124 and 126 are disposed adjacent the support ribs 122 and secondary ribs 132 such that the support rib protrusions 123 are aligned with the support rib recesses 125 and the secondary rib protrusions 133 are aligned with the secondary rib recesses 135. The friction rings 124, 126 are then staked to the ribs 122, 132 by pressing the friction rings together using a press 140 or other known device. Staking the friction rings to the ribs creates a metal to metal bond between the ribs and friction rings which secures the friction rings to the ribs.

Alternatively, an adhesive is used between the friction rings and the ribs to strengthen the bond therebetween. The adhesive may be any suitable adhesive, including a viscoelastic adhesive, which is capable of withstanding the high operating temperatures obtained by the brake rotors during braking. The protrusions 123 may also form a friction fit with the recesses 125 to secure the friction rings to the ribs 122 and 132 in a manner similar to the dowels 40 described above. The friction fit may augment the staking for strengthening the attachment of the friction rings to the ribs. Alternatively, the friction fit may be used in place of the staking.

In accordance with the provisions of the patent statutes, the principles and mode of operation of this invention have been described and illustrated in its preferred embodiment. However, it must be understood that the invention may be practiced otherwise than specifically explained and illustrated without departing from its spirit or scope.

We claim:

1. A brake rotor comprising
   a core having a hat wall and a plurality of circumferentially spaced apart support ribs extending radially outwards from said hat wall, wherein each of said support ribs includes separate inboard and outboard mounting surfaces;
   a pair of friction rings secured to said core, wherein at least one of said friction rings includes an inner surface having recesses formed therein for receiving said support ribs for fastening said at least one of said friction ring to said support rib; and
   an adhesive disposed between said support ribs and said friction rings for securing said friction rings to said support ribs.

2. The brake rotor defined in claim 1 wherein said support ribs include protrusions extending from at least one of said mounting surfaces, wherein said protrusions are received in said recesses for securing said friction rings to said support ribs by a friction fit.

3. The brake rotor defined in claim 2 wherein said protrusions are staked to said recesses for securing said friction rings to said support ribs.

4. The brake rotor defined in claim 2 wherein said protrusions are dowels, said dowels extending through said support ribs and into said recesses to secure said friction rings to said ribs.

5. A brake rotor comprising
   a core having a hat wall and a plurality of circumferentially spaced apart support ribs extending radially outwards from said hat wall, wherein each of said support ribs includes separate inboard and outboard mounting surfaces; and
   at least one friction ring having an inner surface with recesses formed therein for receiving said support ribs to secure said friction ring to said support ribs by a friction fit.

6. The brake rotor defined in claim 5 further including an adhesive disposed between said support ribs and said friction ring for securing said friction ring to said support ribs.

7. The brake rotor defined in claim 6 further including protrusions extending from at least one of said mounting surfaces, wherein said protrusions are received in said recesses to secure said friction ring to said support ribs by a friction fit.

8. The brake rotor defined in claim 7 further including an adhesive disposed between said support ribs and said friction ring for securing said friction ring to said support ribs.

9. The brake rotor defined in claim 7 wherein said core is formed of cast metal.

10. The brake rotor defined in claim 9 wherein said cast core is formed of cast grey iron.

11. The brake rotor defined in claim 10 wherein said cast core is formed of aluminum.

12. A method of manufacturing a brake rotor including the steps of:
   a) forming a rotor core including a hat section and support ribs extending radially outwards from the hat section and having separate inboard and outboard mounting surfaces;
   b) forming a pair of friction rings each having an inner surface and an outer surface;
   c) forming recesses in the inner surfaces of the friction rings; and
   d) pressing the friction rings against the support ribs so that the ribs are received in said recesses to secure the friction rings to the support ribs by a friction fit.

13. The method defined in claim 12 further including depositing an adhesive between the support ribs and the friction rings before pressing the friction rings against the support ribs.

14. A method of manufacturing a brake rotor including the steps of:
   a) forming a rotor core including a hat wall and a flat annular disc extending radially from the hat wall;
   b) machining the disk to form individual, circumferentially spaced apart support ribs each having separate inboard and outboard mounting surfaces;
   c) forming annular friction rings having inner surfaces; and
   d) fastening the inner surfaces of the annular friction rings to the support rib inboard and outboard mounting surfaces.

15. The method defined in claim 14 further including the step of forming recesses in the inner surface of at least one of the friction rings before the step of fastening the friction rings to the support ribs.

16. The method defined in claim 15 wherein the fastening step includes pressing the friction rings towards the support ribs until the support ribs are received in the recesses.

17. The method defined in claim 16 further including the step of forming protrusions extending from the mounting surfaces of the support ribs.

18. The method defined in claim 17 wherein the fastening step includes pressing the friction rings towards the support ribs until the support rib protrusions are received in the recesses.

19. The method defined in claim 17 wherein the step of forming protrusions further includes forming holes extending through the support ribs and inserting dowels in the holes such that the dowels extend out of at least one of the inboard and outboard mounting surfaces.

20. The method defined in claim 19 wherein the step of fastening the friction rings to the support ribs includes pressing the friction rings against ribs so that the dowels are received in the recesses.

* * * * *